United States Patent
Forbis et al.

(10) Patent No.: US 7,363,253 B2
(45) Date of Patent: Apr. 22, 2008

(54) COMPUTER-IMPLEMENTED METHOD AND SYSTEM FOR RETROACTIVE PRICING FOR USE IN ORDER PROCUREMENT

(75) Inventors: Jill Forbis, Commerce Township, MI (US); Todd A. McClimans, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 795 days.

(21) Appl. No.: 10/464,357

(22) Filed: Jun. 18, 2003

(65) Prior Publication Data

US 2004/0078288 A1    Apr. 22, 2004

Related U.S. Application Data

(60) Provisional application No. 60/390,013, filed on Jun. 19, 2002.

(51) Int. Cl.
*G06Q 30/00* (2006.01)
(52) U.S. Cl. .............. 705/26; 705/27; 705/29
(58) Field of Classification Search ......... 705/26, 705/27, 29
See application file for complete search history.

(56) References Cited

U.S. PATENT DOCUMENTS

| | | |
|---|---|---|
| 4,509,123 A | 4/1985 | Vereen |
| 4,799,156 A | 1/1989 | Shavit |
| 5,319,542 A | 6/1994 | King, Jr. |
| 5,666,493 A | 9/1997 | Wojcik |
| 5,758,328 A | 5/1998 | Giovannoli |
| 5,758,329 A | 5/1998 | Wojcik |
| 5,842,178 A | 11/1998 | Giovannoli |
| 5,940,807 A | 8/1999 | Purcell |
| 5,970,475 A | 10/1999 | Barnes |
| 6,038,597 A | 3/2000 | Van Wyngarden |
| 6,055,516 A | 4/2000 | Johnson |
| 6,055,519 A | 4/2000 | Kennedy |
| 6,081,789 A | 6/2000 | Purcell |
| 6,167,378 A | 12/2000 | Weber, Jr. |
| 6,167,385 A | 12/2000 | Hartley-Urquhart |

(Continued)

OTHER PUBLICATIONS

Wilson; "Cost cuts rattle supply chain," Automotive News, Aug. 20, 2001, v75i5944, Proquest #78297363, 4pgs.*

(Continued)

*Primary Examiner*—Robert M. Pond
(74) *Attorney, Agent, or Firm*—Gary Smith; Brooks Kushman P.C.

(57) ABSTRACT

A computer-implemented method for determining retroactive price adjustments is disclosed. The method can include receiving a first initiation message including a first effective time period and/or a first new price for a part being supplied to a first plant. For the first initiation message, the method can include retrieving information pertinent to an at least one receipt received for the part within the first effective time period. For each receipt, the method can include determining a variance based on the difference between the first or second new price and the receipt price, determining a price adjustment based on the variance and the receipt quantity, and generating a retroactive invoice for enabling transfer of the price adjustment, the retroactive invoice including the variance and the price adjustment. The first effective time period can include an effective start date that is before each receipt date.

21 Claims, 11 Drawing Sheets

U.S. PATENT DOCUMENTS

| | | |
|---|---|---|
| 6,233,565 B1 | 5/2001 | Lewis |
| 6,246,994 B1 | 6/2001 | Wolven |
| 6,324,522 B2 | 11/2001 | Peterson |
| 6,343,277 B1 | 1/2002 | Gaus |
| 6,351,738 B1 | 2/2002 | Clark |
| 6,363,365 B1 | 3/2002 | Kou |
| 6,363,488 B1 | 3/2002 | Ginter |
| 6,418,416 B1 | 7/2002 | Rosenburg |
| 6,505,172 B1 | 1/2003 | Johnson |
| 2001/0005835 A1 | 6/2001 | Kodama |
| 2001/0011222 A1 | 8/2001 | McClauchlin |
| 2001/0037255 A1 | 11/2001 | Tambay |
| 2001/0042050 A1 | 11/2001 | Fletcher |
| 2001/0042059 A1 | 11/2001 | Uehara |
| 2002/0016759 A1 | 2/2002 | Macready |
| 2002/0019780 A1 | 2/2002 | Herman |
| 2002/0022985 A1 | 2/2002 | Guidice |
| 2002/0038258 A1 | 3/2002 | Inoue |
| 2002/0042755 A1 | 4/2002 | Kumar |
| 2002/0042756 A1 | 4/2002 | Kumar |
| 2002/0042757 A1 | 4/2002 | Albazz |
| 2002/0046081 A1 | 4/2002 | Albazz |
| 2002/0046147 A1 | 4/2002 | Livesay |
| 2002/0046176 A1 | 4/2002 | Seo |
| 2002/0055888 A1 | 5/2002 | Beran |
| 2002/0065762 A1 | 5/2002 | Lee |
| 2002/0077958 A1 | 6/2002 | Gardner |
| 2002/0091594 A1 | 7/2002 | Rosenburg |
| 2002/0143667 A1 | 10/2002 | Ho |
| 2002/0174020 A1 * | 11/2002 | Grey et al. .................. 705/26 |
| 2002/0178021 A1 | 11/2002 | Melchior |
| 2002/0188499 A1 | 12/2002 | Jenkins |
| 2003/0014299 A1 | 1/2003 | Hoffman |
| 2003/0036972 A1 | 2/2003 | Zamma |
| 2003/0036991 A1 | 2/2003 | Fortes |

OTHER PUBLICATIONS

Gould, L; "How ERP systems must meet the challenges of automotive suppliers," Automotive Manufacturing & Production, v110i11pg64, Proquest #36132059.*

Computer compact disc entitled "Oracle Applications 11i" Documentation Library Release 11.5.1.

Article entitled "eProcurement Ensures Visionary Companies a Place in the New Economy", Analyst: Albert Pang Copyright 2001.

* cited by examiner

COMPUTER-IMPLEMENTED METHOD AND SYSTEM FOR RETROACTIVE PRICING FOR USE IN ORDER PROCUREMENT

CROSS-REFERENCE TO RELATED APPLICATIONS

This application claims the benefit of U.S. provisional application Ser. No. 60/390,013, filed Jun. 19, 2002, and entitled "Method and System for Retroactive Pricing For Use In Order Procurement".

BACKGROUND OF THE INVENTION

1. Field of the Invention

One of the aspects of the present invention relates to electronic procurement systems having a purchase order for acquiring products from a supplier.

2. Background Art

A distributed enterprise is an organization having multiple operations spread across a geographic region, continent or globe. In today's business environment, thousands of businesses have operating facilities located in more than one country or continent. For example, an automobile manufacturer may have multiple management facilities, engineering facilities, manufacturing facilities, assembly facilities, distribution facilities, sales facilities and service facilities located within most countries and every continent on the planet. Each of these facilities must, in turn, deal with a second-tier of often equally-distributed supplier communities. Most procurement systems are tailored to effectively meet the needs of smaller to mid-sized businesses having a few, if any, distributed business operations or supplier base. However, these conventional systems lack functionality to effectively support certain business needs of large to very large companies that are distributed across a wide geographical range.

For years, electronic data interchange (EDI) and virtual private network (VPN) technologies have enabled businesses and their suppliers to exchange invoices, purchase orders, and other documents to conduct their day-to-day business online. Typically, these systems were proprietary in nature, required a dedicated technical infrastructure, and required a costly subscription or pay-per-use access arrangement.

The advent of the Internet has revolutionized electronic procurement systems by decreasing the speed, cost and other hurdles associated with the first-generation systems. Without such access barriers, buyers are presented with a broader horizon of potential suppliers. Today, a buyer organization can access the Internet to obtain pricing information, product and service information, submit a purchase request, route the request for approval, view the fulfillment status of the request, receive a receipt and delivery notification, and transmit payment.

According to one IDC survey conducted in September 2000, the amount of savings generated with the use of an Internet-enabled procurement system will, on average, range from 5.0% to 8.5% of a company's purchasing budget. Depending on the size of the company, this savings can translate to over a billion dollars annually.

In the manufacturing industry, resource demand can be generalized into two broad categories: direct and indirect. Direct procurement includes the purchasing of resources that make up the product ultimately being manufactured. Indirect procurement includes the purchasing of "support" resources that are necessary to bring about the manufacture of the product. In an automobile manufacturing example, a direct resource might be the paint or windshield for a particular automobile. An indirect resource might include a day-to-day commodity such as wrenches or safety glasses that, although not technically a part of the automobile, are indirectly necessary to manufacture the automobile.

Today, companies such as General Electric and Compaq Computer have integrated electronic procurement systems to streamline the online sourcing and purchasing of direct and indirect materials. For example, Compaq Computer employees can use their Web browser to view an online supplier catalog of over 37,000 items, and easily purchase the resources necessary to satisfy their day-to-day needs. Companies such as Compaq can expand this functionality to increase the variety of resources available, rationalize its supply base, and consolidate its supply chain in an effort to leverage purchase volumes into fewer suppliers and improve its relationship with a preferred supply base.

Issued U.S. patents relating to electronic procurement applications and systems include U.S. Pat. No. 5,970,475 to Barnes et al. and U.S. Pat. No. 6,363,365 to Kou. Published U.S. patent applications relating to electronic procurement applications and systems include U.S. patent application Ser. No. 2001/0042050 to Fletcher et al. Additional information relating to electronic procurement systems includes Albert Pang's IDC White Paper *eProcurement Ensures Visionary Companies a Place in the New Economy*, July 2001.

As comprehensive and beneficial as today's procurement systems may be, there still remains a wide horizon for improvement. For example, even the most advanced systems, like the Oracle 11i system, including Sourcing, Purchasing, and Accounts Payable, can be improved as such systems lack the capability for retroactively changing the price of products acquired under a purchase order relative to a past time period.

SUMMARY OF THE INVENTION

According to a first embodiment of the present invention, a computer-implemented method for determining retroactive price adjustments is disclosed. The method includes receiving a first initiation message for initiating a first pricing event for a part acquired for use by a first plant. The first initiation message can include a first effective time period and/or a first new price for the part. The first effective time period can include at least an effective start date and the effective start date can be before each receipt date.

For the first initiation message, the method can include retrieving information pertinent to an at least one receipt received for the part within the first effective time period. The information for each receipt can include a receipt date, a receipt quantity, and a receipt price.

For each receipt, the method can include determining a variance based on the difference between the first or second new price and the receipt price, determining a price adjustment based on the variance and the receipt quantity, and generating a retroactive invoice for enabling transfer of the price adjustment. The retroactive invoice can include the variance and the price adjustment. Advantageously, the at least one retroactive invoice can be relied upon by buyers and suppliers for receiving retroactive price adjustments.

In certain embodiments, the method can further include receiving a second initiation message for initiating a second pricing event for the part acquired for use by a second plant. The second initiation message can include a second effective time period and/or a second new price for the part. For the first and second initiation messages, the method can include retrieving information pertinent to an at least one receipt received for the part within the first or second effective time period. The information for each receipt can include a receipt date, a receipt quantity, and a receipt price. The second effective time period can be comprised of at least a start effective date and the start effective date can before the receipt date of each receipt retrieved based on the second initiation.

In certain embodiments, the part can be acquired by the first and second plant according to a blanket purchase agreement. The blanket purchase agreement can be created upon receipt of the part by the first and/or second plant. In such circumstance, the price of the part is established based on the first effective time period and/or the first new price and/or the second effective time period and/or the second new price.

In certain embodiments, the first and second effective time periods are each defined by a start effective date and an end effective date. The first new price can be effective for the first effective time period and the second new price can be effective for the second effective time period.

According to certain embodiments, the part has not been physically received by the first and/or second plant prior to execution of the pricing method. In other embodiments, the part has been received by the first and/or second plant prior to execution of the pricing method.

If the variance for at least one receipt is positive, the retroactive invoice for the at least one receipt can be a credit invoice and the price adjustment for the at least one receipt can be transferred to the supplier.

If the variance for at least one receipt is negative, the retroactive invoice for the at least one receipt can be a debit invoice and the debit invoice for the at least one receipt can be transferred to the supplier.

The method can further include generating a pricing report for at least one receipt. In certain embodiments, the pricing report can include the receipt date, the receipt quantity, and the price adjustment. The pricing report can be transmitted to the supplier. The transmitting step can include transmitting the pricing report via an electronic data interface.

According to a second embodiment of the present invention, a computer-implemented system for determining retroactive price adjustments is disclosed. The system can include an at least one server computer for communicating with at least one client computer. The at least one server computer can be configured to receive a first initiation message for initiating a first pricing event for a part acquired for use by a first plant. The first initiation message can include a first effective time period and/or a first new price for the part. The first effective time period can include at least an effective start date and the effective start date can be before each receipt date.

For the first initiation message, the at least one server computer can be configured to retrieve information pertinent to an at least one receipt received for the part within the first effective time period. The information for each receipt can include a receipt date, a receipt quantity, and a receipt price.

For each receipt, the at least one server computer can be configured to determine a variance based on the difference between the first or second new price and the receipt price, determine a price adjustment based on the variance and the receipt quantity, and generate a retroactive invoice for enabling transfer of the price adjustment. The retroactive invoice can include the variance and the price adjustment.

Advantageously, the at least one retroactive invoice is relied upon by buyers and suppliers receiving retroactive price adjustments.

In certain embodiments, the part can be acquired by the first plant according to a blanket purchase agreement. The blanket purchase agreement can be created upon receipt of the part by the first plant. In such circumstance, the price of the part is established based on the first effective time period and/or the first new price.

In certain embodiments, the first effective time period can be defined by the start effective date and an end effective date. The first new price can be effective for the first effective time period.

According to certain embodiments, the part has not been physically received by the first plant prior to execution of the pricing method. In other embodiments, the part has been received by the first plant prior to execution of the pricing method.

If the variance for at least one receipt is positive, the retroactive invoice for the at least one receipt can be a credit invoice and the price adjustment for the at least one receipt can be transferred to the supplier.

If the variance for at least one receipt is negative, the retroactive invoice for the at least one receipt can be a debit invoice and the debit invoice for the at least one receipt can be transferred to the supplier.

The at least one server computer can be configured to generate a pricing report for at least one receipt. In certain embodiments, the pricing report can include the receipt date, the receipt quantity, and the price adjustment. The pricing report can be transmitted to the supplier. The transmitting step can include transmitting the pricing report via an electronic data interface.

A third embodiment of the present invention is directed at a computer-readable product for determining retroactive price adjustments, the product being produced by a computer-implemented process. The process can include receiving a first initiation message for initiating a first pricing event for a part acquired for use by a first plant. The first initiation message can include a first effective time period and/or a first new price for the part. The first effective time period can include at least an effective start date and the effective start date can be before each receipt date.

For the first initiation message, the process can include retrieving information pertinent to an at least one receipt received for the part within the first effective time period. The information for each receipt can include a receipt date, a receipt quantity, and a receipt price.

For each receipt, the process can include determining a variance based on the difference between the first or second new price and the receipt price, determining a price adjustment based on the variance and the receipt quantity, and generating a retroactive invoice for enabling transfer of the price adjustment (the retroactive invoice including the variance and the price adjustment).

Notably, the process includes storing one or more of the retroactive invoices in a computer-readable product for use in pricing parts for one or more plants. The at least one retroactive invoice can be relied by buyers and suppliers for receiving retroactive price adjustments.

A fourth embodiment of the present invention is a program for controlling a computer of a server for determining retroactive price adjustments. The program can include instructions for receiving a first initiation message for initiating a first pricing event for a part acquired for use by a first plant. The first initiation message including a first effective time period and/or a first new price for the part. The first effective time period can include at least an effective start date and the effective start date can be before each receipt date.

For the first initiation message, the program can include instructions for retrieving information pertinent to an at least one receipt received for the part within the first effective time period. The information for each receipt can include a receipt date, a receipt quantity, and a receipt price.

For each receipt, the program can include instructions for determining a variance based on the difference between the first or second new price and the receipt price, instructions for determining a price adjustment based on the variance and the receipt quantity, and instructions for generating a retroactive invoice for enabling transfer of the price adjustment. The retroactive invoice can include the variance and the price adjustment. Advantageously, the at least one retroactive invoice is relied upon by buyers and suppliers for receiving price adjustments.

The above embodiments and other embodiments, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings:

Figure 10:
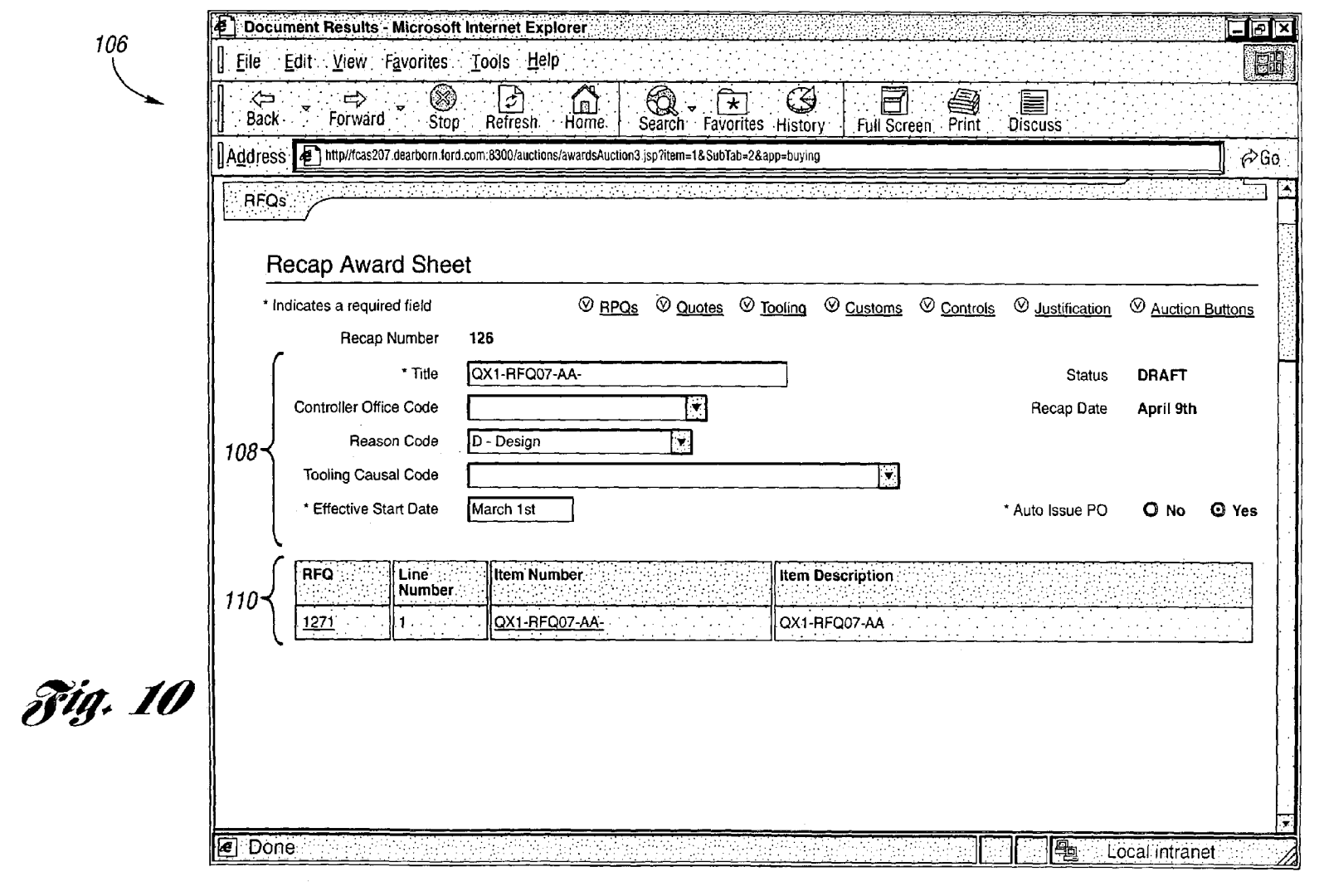

FIG. 10 is an example of a GUI for entering award information in accordance with an embodiment of the present invention;

FIG. 12 is an example of a blanket purchase agreement form revised to reflect a price change and/or effective date in accordance with an embodiment of the present invention.

These figures are intended for exemplary purposes of illustrating different capabilities of the method and system disclosed herewith having capabilities for retroactive pricing for use in order procurement.

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

A system having capabilities for retroactive pricing for use in order procurement can include any number of computer related microprocessing and software applications. The microprocessing and software applications are referenced to as tools. The system can include various tools for achieving retroactive capabilities, and the system can include tools associated with a purchase agreement, a receipt, an invoice, and some type of microprocessing device having software applications capable of retroactive action.

Figure 1:
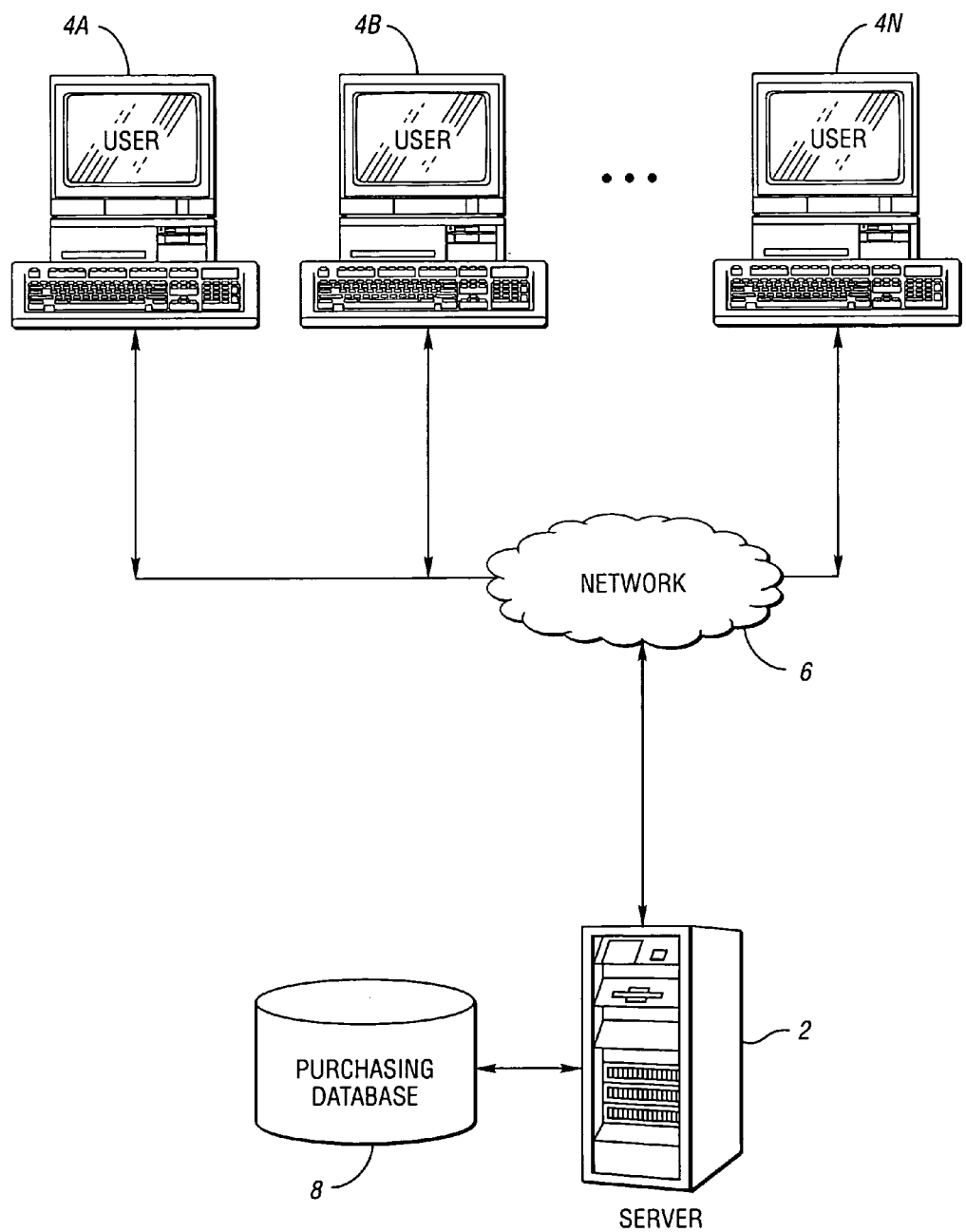
FIG. 1 depicts a schematic diagram illustrating a system embodiment for implementing certain embodiments of the present invention.

FIG. 1 depicts a schematic diagram illustrating a system embodiment for implementing certain embodiments of the present invention. FIG. 1 illustrates an at least one server computer 2 operably serving a plurality of client computers 4a-n, which can communicate with server 12 utilizing a TCP-IP communication protocol via network/LAN 6. Server computer 2 can be configured to operably store information to, and retrieve data from, at least one purchasing database 8.

The purchase agreement represents an agreement between a purchaser and a seller for terms and conditions of a sale of a product from the buyer to the seller. For example, in the automotive industry, blanket purchase agreements are often made between a buyer and a supplier, whereby the buyer can continuously acquire products from the supplier in accordance with the terms of the purchase agreement on a regular basis, or even on an irregular basis when the buyer so desires.

The purchase agreement tool can include data relevant to the terms of the agreement, like a price, a start date, and an end date, which can be communicated to computer or microprocessor for data storage and manipulation. This data can be entered by the buyer using a data entry tool or by a computer automatically retrieving the information from other databases and legacy systems, or any other means.

When the supplier ships the products to a buyer's plant, the receipt can be generated with a receipt tool to signify receipt of the product by the plant. As is common in the automotive industry, the receipt can be caused to be generated by the buyer, the plant or automatically with logistics type software systems. The receipt tool can include data, like a receipt quantity, receipt date, shipment date, and product item number which can be communicated to a computer for data storage and manipulation.

When additional products are received by the plant in additional transactions under the purchase agreement, additional receipts are generated for each receipt of products from the different transactions. In this manner, the computer can keep track of the quantity of products received by the plant under the purchase agreement. The computer can even keep track of the receipt quantity and the receipt date for each receipt individually or the receipt quantity and the receipt date for a cumulative total, of all or some, of the receipts. Accordingly, the computer can determine the quantity of parts purchased by the buyer from the supplier for any time period between the first receipt of the product and the last receipt of the product.

Based on the data from the receipt, the computer can cause the generation of an invoice by an invoice tool. The invoice tool includes data, like a detailed list of goods shipped or received and an invoice amount. The invoice amount represents the value for the product purchased under purchase order. The invoice is delivered to the supplier as a payment for a debit or credit against the supplier for the purchased products. The payment can be delivered by mail or by electronic funds transfer (EFT).

As evidenced by the foregoing, the system includes a number of tools which provide different capabilities for retroactive pricing for use in order procurement. These tools, and the others described below, allow the system to achieve capabilities for retroactive pricing.

For example, as the computer can keep track of multiple receipts received under a purchase agreement, along with the receipt quantities, receipt dates, and shipment dates associated with each of the receipts, the computer can determine both the pricing and the quantity for products acquired during a particular time period. In other words, the computer can determine a time period and then select all the receipts which have a receipt or shipment date within the parameters of the determined time period for analysis to determine both the pricing and the quantity for the acquired products. The time period can be a time period in the past, i.e., a retroactive time period.

The time period determined by the computer typically corresponds to a past date in which the terms and conditions of the purchase are to be changed. For example, in the automotive industry buyers often negotiate with a supplier for the supplier's products. In many cases, the buyer desires the product prior to the determination of a negotiated price. One way to deliver the product prior to the establishment of the negotiated price includes opening the purchase agreement with an initial purchase price, whereby the initial purchase price can later be changed once negotiations are completed.

The difficulty lies in retroactively making pricing adjustments to the products acquired by the buyer prior to the establishment of the new negotiated price. Even more problematic, the price may be greater than the initial purchase price, or the price may be less than the initial purchase.

Figure 2:
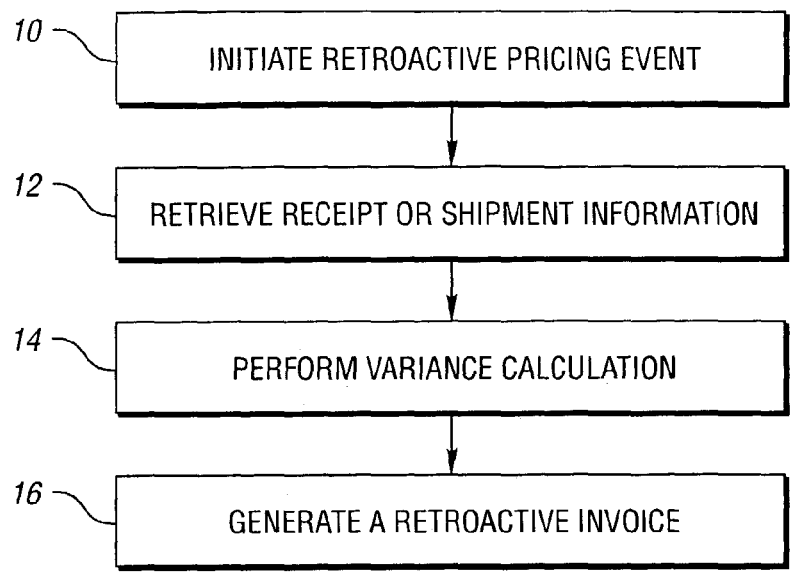
FIG. 2 is a flowchart for a retroactive pricing adjustment method in accordance with an embodiment of the present invention.

Disclosed herewith is one method of retroactively adjusting the price of a received product by generating an invoice which debits or credits the supplier based on a retroactive time period in which the products were received by the plant. FIG. 2 is a flowchart for a retroactive pricing adjustment method in accordance with an embodiment of the present invention. As depicted by blocks 10 and 12, the method includes initiating a retroactive pricing event which triggers the computer to retrieve a receipt. As depicted by blocks 14 and 16, the receipt is then used to perform a variance calculation for generating a retroactive invoice.

Figure 3:
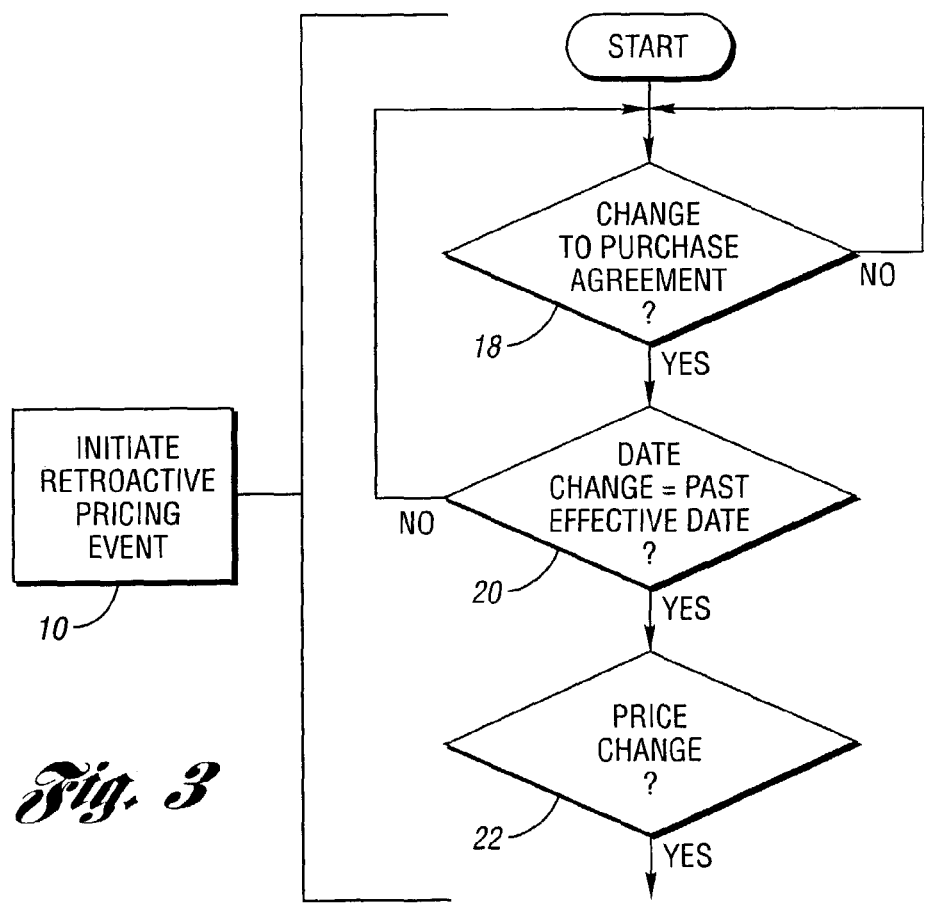
FIG. 3 is a flowchart for initiating a retroactive pricing event in accordance with an embodiment of the present invention.

FIG. 3 is a flowchart for initiating a retroactive pricing event in accordance with an embodiment of the present invention. As depicted by decision block 18, a retroactive pricing adjustment occurs when there is a change to the purchase agreement. It should be understood that block 18 can represent creation of a purchase agreement with a past effective date. The change contemplated in block 18 can be a direct or indirect change to the purchase agreement. There are at least two ways to initiate a retroactive price change: (1) claims for a non-design price change and (2) request for quotation (RFQ) process for design price change.

As depicted by decision blocks 20 and 22, the change to the purchase agreement can occur for a date change and may also include a price change. The price change often occurs after the buyer begins receiving parts under a particular purchase agreement when the price at which those products were acquired changes and the buyer desires to make the price change retroactive to the products previously acquired.

In other cases, the price may not have changed, but the effective date of the price has changed. For example, parts may be acquired under a purchase agreement beginning on some prior effective date and for some reason, like a negotiation, the buyer will desire to apply the purchase agreements to products acquired even before that prior effective date. In this situation, though the price has not changed, the date has changed to a prior effective date.

In yet another case, the purchase agreement may not exist prior to the parts being received. This situation can occur when needs have changed and the buyer desires to purchase a product but does not know the price of the product, or simply needs to acquire the product quickly. In these events, the purchase agreement has not been established by the time parts are received. These parts are said to have a missing price. When the buyer does source the parts by selecting a supplier and agreeing on a price, the purchase agreement would be established with a past effective date to cover shipments already received.

In either price changes, past effective date changes, or missing prices, the value paid, or not paid, for the product is different than what the buyer desires to pay for the product. Accordingly, the capabilities to correct this problem are addressed by having a retroactive pricing system and method which can employ various tools for looking into the past to perform variance calculation for paying the amount desired by the buyer.

Figure 4:
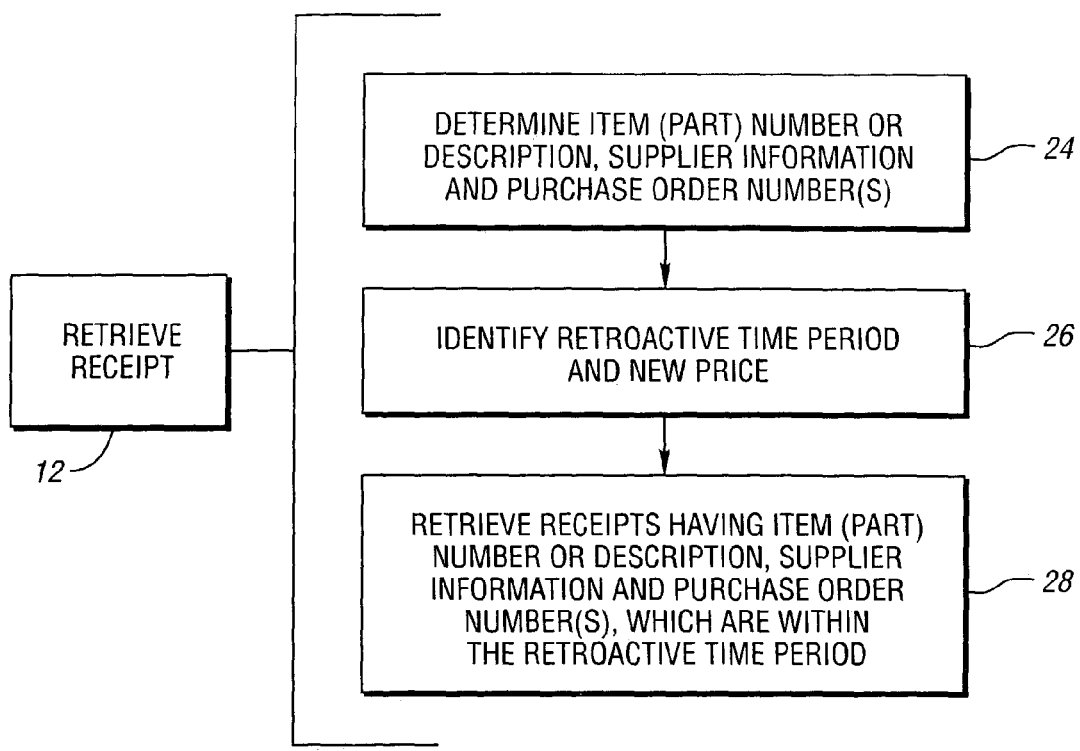
FIG. 4 is a flowchart for retrieving a receipt or shipment information in accordance with an embodiment of the present invention.

FIG. 4 is a flowchart for retrieving a receipt or shipment information in accordance with an embodiment of the present invention. Once a retroactive pricing event has been initiated, the corresponding receipt/shipment information can be retrieved by the computer. The receipts are used to track the date and quantity of products acquired under the purchase agreement. The receipt can include many different types of data, and usually the product item number, product description, date shipped, date received, purchase order number, quantity, etc. In this way, the computer can use any one or more of the types of data to retrieve the appropriate receipt. As depicted by block 24, the computer can then determine the date and quantity of the products acquired under the purchase agreement.

As depicted by block 26, in all retroactive events, the time period is in the past, and usually limited to a specific interval within the past, which is commonly referred to as a retroactive time period. As depicted by block 28, the computer then can determine the range of relevant receipts which fall within the specific interval for initiating a retroactive correction.

With the relevant receipts, the computer performs a variance calculation to determine the credit or debit to be transferred to the supplier in order to correct the payments previously sent to the supplier in accordance with the desires of the buyer.

Figure 5:
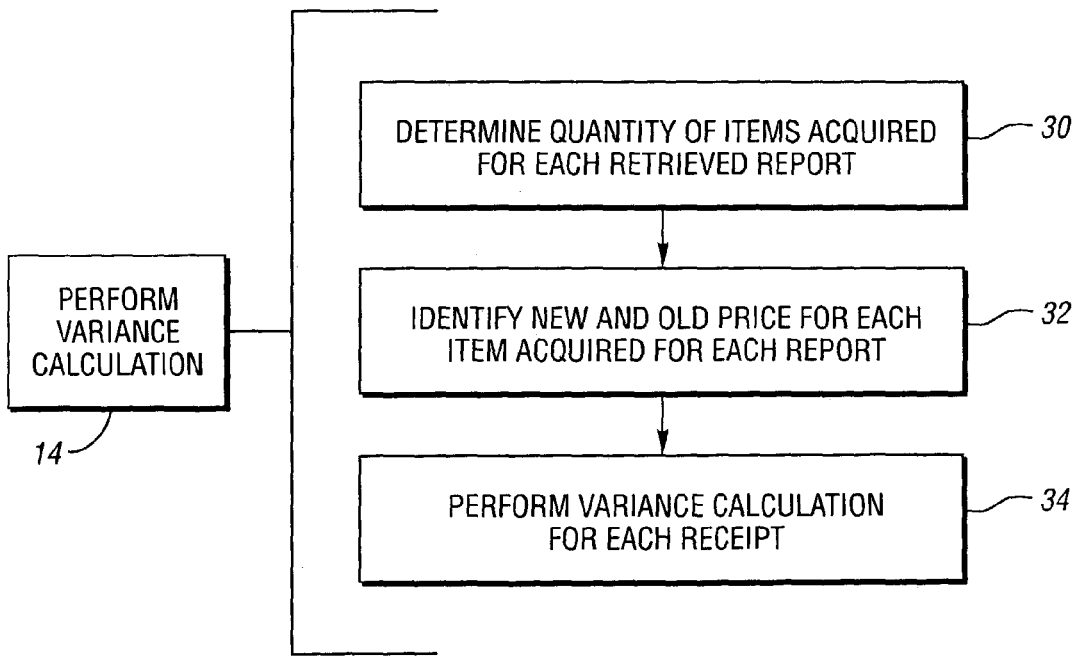
FIG. 5 is a flowchart for performing variance calculation in accordance with an embodiment of the present invention.

FIG. 5 is a flowchart for performing variance calculation in accordance with an embodiment of the present invention. As depicted by blocks 30 and 32, in performing the variance calculation the quantity and price for each retrieved receipt is determined so that the computer can multiply the quantity of products with the pricing to determine the value paid for the products acquired under each retrieved receipt.

As depicted by block 34, using this information, a variance calculation can be performed by comparing the value paid for each receipt against the new price in light of the changes to the purchase agreement. For price changes, the variance value is simply the difference between the new price and the last price paid times the quantity from the receipt. The total variance can be based on one receipt or it can be the resulting total of adding up each variance value for each retrieved receipt.

For past effective date changes, receipts which were not a part of a purchase agreement have been incorporated by the change to the purchase agreement. Accordingly, in some cases the price may be different from the price on the original purchase agreement, and in other cases it may not. When the price is different, a similar calculation as described above for price changes is used, wherein the calculation compares the price of the purchase agreement to the price of the purchase agreement which applied to the receipts now being incorporated by the change to the purchase agreement. If a receipt is received and a purchase agreement exists for the same, meaning that item, supplier, unit of measure, plant, and effective dates exist, an invoice can be issued and paid on according to supplier terms.

For missing price, the products were never paid for, thus the variance is simply the new prices times the quantity of products acquired for all of the retrieved receipts.

Figure 6:
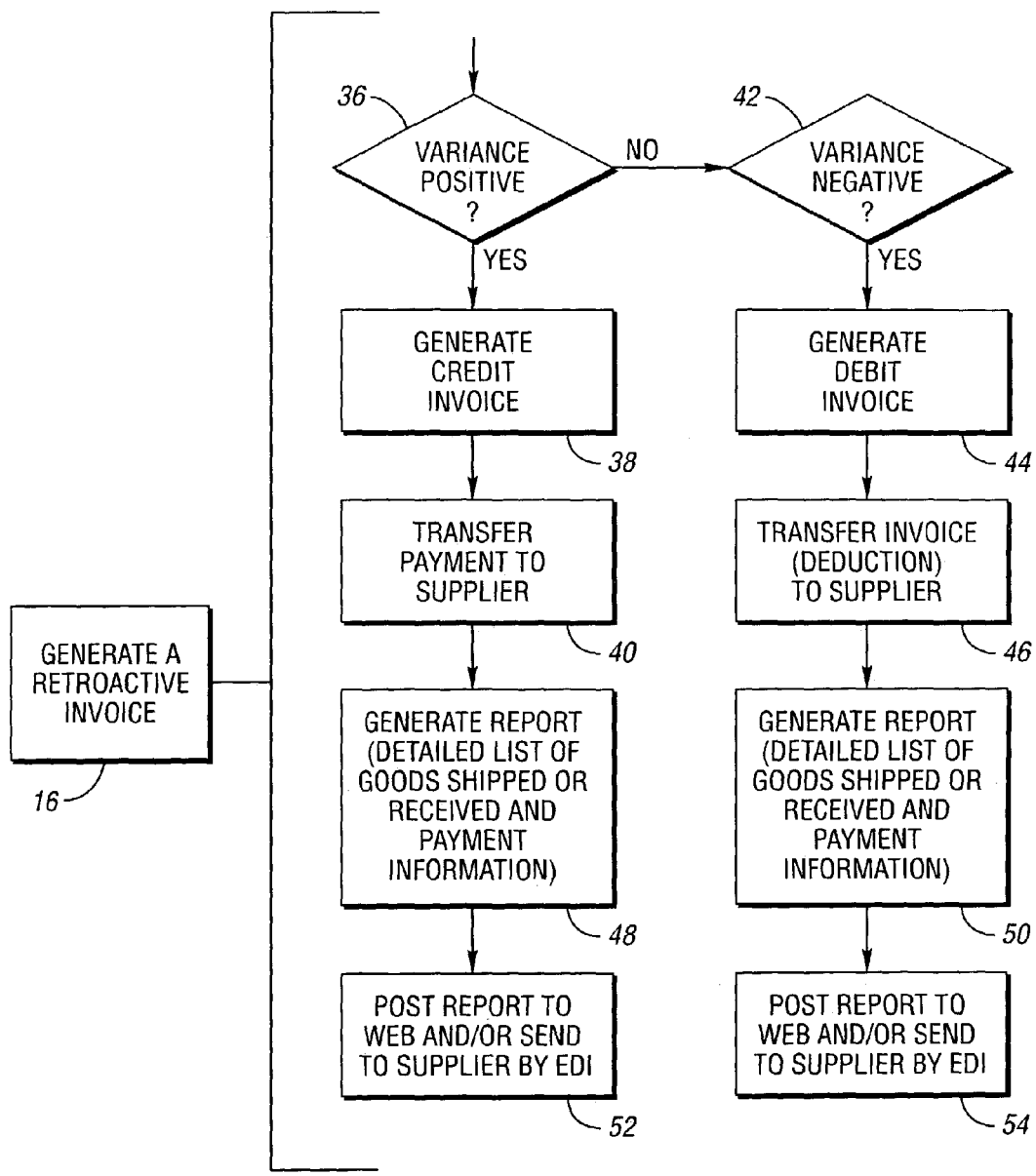
FIG. 6 is a flowchart for generating a retroactive invoice in accordance with an embodiment of the present invention.

FIG. 6 is a flowchart for generating a retroactive invoice in accordance with an embodiment of the present invention. The variance calculation is used for generating a retroactive invoice for crediting or debiting the supplier based on the change to the purchase agreement. As depicted by blocks 36, 38, and 40, if the variance is positive, a credit is generated and transferred to the supplier. As depicted by block 42, 44 and 46, if the variance is negative, a debit can be generated and transferred to the supplier. In both cases, the transfer is usually carried out in accordance with the terms of the purchase agreement.

As depicted by blocks 48 and 50, in most cases, reports are generated and posted on the web for the suppliers to review. As depicted by blocks 52 and 54, the reports can be sent to the supplier via electronic data exchange (EDI). The reports include any number of different types of data, and in most cases, the reports at least convey to the supplier the effect of the retroactive invoice and the terms and conditions which apply thereto.

Following this method, with the help of the tools described above and below, the computer is able to look into the past to perform a retroactive variance calculation for paying the amount desired by the buyer to correct a change caused by a change to the purchase agreement.

Additional Tools Having Functionality Capabilities For Retroactive Pricing

A retro pricing tool is provided so retroactive pricing amendments can be entered into purchase ordering systems. The tool allows buyers to initiate changes to purchase orders or purchase agreements with a price that is retroactive meaning all products acquired after the price change receive the new price and a debit/credit is issued for products previously acquired to which the price change pertains. Accordingly, payments made at an original price for goods or services already received can be adjusted based on a difference between the original price and the new price.

If the buyer is confronted with a part that has been redesigned and shipped to a plant before the buyer can determine a price for the part and establish a purchase agreement, the retro pricing tool has the ability for the buyer to later establish an agreement with a supplier. In this case, the purchase agreement is added later, including the price and terms to cover the goods already received and a debit/credit can be issued for the products already received.

The retro pricing tool can allow a buyer to make corrections to a current price. For example, a buyer can add a firm price to a purchase order which includes an estimated or interim price. The estimated or interim price can be the result of a situation in which a part has been redesigned and shipped to a plant before the buyer can determine a price for the part.

The retro pricing tool can include the ability for a buyer to make a price change retroactive to a negotiated effective date for the price change. Accordingly, the buyer can gain productivity through fact-based discussions with suppliers during negotiation because the buyer is able to buy and the supplier is able to ship parts during the negotiations. Once the negotiation is finished, the prices of the goods shipped during negotiation can be adjusted retroactively to reflect the negotiated price.

The retro pricing tool provides a general sequence of events for the process for use in a purchasing system and accounting system. For example, the process provides the use of a blanket purchase order for the pricing system which can be amended retroactively to a preceding effective start date that is prior to a current date. The process provides the retroactively amended purchase order for recognizing a price amendment as having a "retro" date.

The retro pricing tool provides an ability for searching a database for any receipts or shipments that may have been evaluated after the new "retro" effective date. When such receipts are found, the receipts can be evaluated for new prices so that the new prices can be calculated for variance from the original receipt. Optionally, a receipt can be flagged as having been adjusted so that the variance can be stored with the evaluated receipt. Accordingly, retro changes can be tracked without losing the history and without having to adjust the receipt. Optionally, the process is repeatable for all receipts between that retroactive effective date and the current date.

The retro pricing tool can generate a self-billing invoice for listing by part all the receipts and adjustments to the receipts.

The retro pricing tool can generate a retro invoice so payment can be issued to a supplier immediately or based on payment terms set with the supplier.

The retro pricing tool can provide remittance advice to a supplier indicating a total retro adjustment amount and details for each affected receipt. The remittance advice can include the suppliers invoice number for referencing the details of the retro transaction. Moreover, it may be beneficial for suppliers to submit a complimentary invoice for receiving payment in the situation where the price has increased.

The retro pricing tool can enter an adjustment to a general ledger. For example, a single account number can be used for retro adjustments.

The retro pricing tool can provide a receipt having multiple retroactive adjustments, and each adjustment can be stored with a relevant receipt.

A time frame can be provided in which retro adjustments can be allowed depending on a business unit and a system currently handling the adjustments. For example, direct materials can have retroactive adjustments within the preceding two years.

The retro pricing tool can address design price changes and non-design price changes for direct materials.

The retro pricing tool can use a master price history. For example, price changes, whether a change is a design price change or a non-design price change, can be added to the master price history to reflect a current price that the buyer has provided. Any prices that existed previously can be ignored and can be eliminated for use in payment. For non-design price changes, the buyer can enter the productivity gain as a percentage change or as an absolute value. Adjustment to all future scheduled price adjustments can be made based on the productivity change.

The retro pricing tool can provide a retroactive price change process to begin with a buyer entering a price change, whereby the process can conclude by posting an adjustment to a general ledger. An input to the process can be a price change with an effective start date in the past. An output of the processes can be a payment to or recovery from the supplier.

The retro pricing tool can provide a retroactive process having a step for retrieving a history of goods shipped and received from which a retro price impact is calculated to create a price adjustment invoice. This information can then be reported with the invoice.

The retro pricing tool can address initiatives related to retroactive price changes for self-billed invoices, non-design price change (NDPC), and missing prices.

The retro pricing tool can allow a buyer the capability to electronically amend an existing standard purchase order or blanket purchase agreement with a new price effective for a date in the past. The buyer could enter an effective start date for the price change. Moreover, a price change can trigger a normal revision and re-approval process, whereby price changes can become firm when the approval process is complete.

The retro pricing tool can provide a buyer functionality to accommodate price changes due to design price changes and non-design price changes. For design price changes, the buyer can have the capability to enter a new absolute price. For non-design price changes, the buyer can have the capability to enter a price change as a fixed amount or a percentage price change.

The retro pricing tool can provide a buyer the ability to amend a purchase order with a retroactive price and amend the effective dates any number of times for any particular item, i.e., retro on a retro pricing amendment.

The retro pricing tool can provide a buyer the ability to make retroactive price adjustments for at least the two preceding years. Moreover, a history can be maintained to capture price changes with the corresponding effective start and end dates, where applicable, so that the buyers can have access to the data stored therein.

The retro pricing tool can provide a retro self-billing invoice as a product of the payment process listing by part all the receipts and adjustments for the receipts. For example, the retro self-billing invoice can have information specifically for retro pricing, like effective date of retro action, old price, new price, and difference in price.

The retro pricing tool can provide a supplier to be paid or refunded for an amount of a retroactive adjustment. For example, when a supplier is paid, there can be a payable invoice generated. When a supplier is refunded, there can be a payables debt memo generated. The payables invoice and the payables debt memo can include all receipts or shipments that fall within a specified effective start and end date of the price change. Moreover, the self-billing invoice can be provided to the supplier detailing the effective retro price change by including information, such as a total retro adjustment amount, a reason code, a seller's invoice number, and a reference number which has a code indicating that the reference number is a retro adjustment. Moreover, each receipt can provide a receipt number, a packing slip number, a plant ship to location, a quantity, a unit of measure, an invoice number and date, receipt date and shipment date, old price, and new price. Furthermore, remittance advice can reference the self-bill invoice number.

The retro pricing tool can provide an invoice for calculating tax on a line-by-line basis for meeting the needs of different countries, like Brazil and Argentina.

The retro pricing tool can provide a retroactive price adjustment that can be posted to a general ledger account. The account number can vary depending on a legal entity attached to a receipt.

Moreover, a self-billed invoice can be provided to a supplier detailing for each receipt a supplier manufacturing code.

The retro pricing tool can provide a due date of supplier payment based on terms set with the supplier to be calculated from the original receipt dates or ship dates.

The retro pricing tool can provide a retro pricing process having an ability to use a date range for determining receipts or shipments affected by a retroactive price change.

The retro pricing tool can provide retro payments that can be made according to supplier terms for ensuring that retro adjustments are coordinated with the payments for the original receipts.

The retro pricing tool can provide a retroactive price adjustment process having a first step of inputting purchase order information, which can include new prices, and effective start date. Therefrom, the inputted information can be used for retrieving corresponding receipt or shipment data from a database, whereby the information can also be used in conjunction with the receipt or shipment date for searching price change histories for the receipt data so that an amount change can be calculated for each receipt. The process can calculate the original price paid (effective old price and then apply the difference between the old price and new price times the quantity shipped or received to generate an invoice). If the price change is positive, then a positive invoice can be created. If the price change is negative, then a negative invoice can be created.

The retro pricing tool can provide retroactive pricing for the following scenarios. For example, a blanket purchase agreement for a design price change having an end term price with no effective end date can be generated. The buyer can receive a notification indicating a part has undergone a design price change. The buyer can create a new blanket purchase agreement for the part with a new effective date with an interim price for a supplier. This information can then be reproduced on a blanket purchase agreement. If the new part design was shipped to three different plants, for example, and received into inventory, then the receipts can be organized according to packing slip numbers. The receipt history can be retrieved for all receipts from and forward for the part. Accordingly, the retro price impact can be calculated based on the new price, old price, and quantity. Therefrom, a retro price adjustment process can create a retro invoice for the calculated price, along with a due date calculated from the date of each receipt. The supplier can then be sent a self-billed invoice.

The retro pricing tool can provide a blanket purchase agreement for a design price change having an interim price with an effective end date. The buyer can receive an authority to precede indicating a part has undergone a design price change. The buyer can create a new blanket purchase agreement for a part number and an effective date for the part number with an interim price for a particular supplier. When a price change occurs and the price change includes an effective start date, the buyer can then amend the blanket purchase agreement with a new price. Based on the start date, a receipt or shipment history can be retrieved for all receipts which fall within that period for the part number and the supplier. The supplier can then be sent a self-bill invoice as a result of the payment process.

The retro pricing tool can provide a blanket purchase agreement for non-design price changes. A buyer can negotiate with a supplier for a productivity gain for a particular part. The buyer can then use a blanket purchase agreement for the part effective from a start date with a new price for a particular supplier. This information can then be produced for the part name and the start date and new price in a blanket purchase agreement. Receipts can also be generated for the part name in accordance with packaging slip numbers which correspond with different plants that receive the part into inventory. When negotiations are completed, the buyer can reduce the price by the productivity gain retroactively to the effective start date. A receipt history can then be retrieved for all receipts from the effective start date for the part number and the supplier so that a retro price impact can be calculated. Retro price adjustment can then create a retro invoice with a due date calculated from the date of each receipt, whereby the supplier can be sent a self-bill invoice.

The retro pricing tool can provide a blanket purchase agreements having a retroactive price change to a previous retroactive price change. In this case, a buyer can amend the previous blanket purchase agreement with a new price and a new effective time period. Therefrom, a receipt history can be retrieved from all receipts for the new effective time period for the part number and the supplier.

The retro pricing tool can provide all transactions with the ability to be posted in the current period, as opposed to prior period postings. Moreover, currency changes can be automatically assigned current exchange rates. Moreover, invoices from the original receipts can be generated in a separate process by accounts payable.

The retro pricing tool can provide that the contents of the reports generated can be provided to a supplier detailing the fact of a retro price change. The invoice can include information like a total retro adjustment amount, a reason code, a seller invoice number, and a reference number indicating that it is a retro adjustment. Line information for each receipt can provide information, like a receipt number, a packing slip number, a client ship-to location, a quantity, unit of measure, and invoice number and date, a receipt date and shipment date, an old price, and a new price.

The retro pricing tool can provide remittance advice that can reference the self-bill invoice number.

The retro pricing tool can provide a part number, and description ship-to plant code, supplier ship-from code, effective start date; quantity, price paid, variance, currency, purchase order number, amendment number, and process date (date retro adjustment processing), original transaction date (date of original receipt using old price), account number (of the account being adjusted by Retro), and bar code.

Implementation of Retro Pricing Tool

The retro pricing tool can be implemented using Oracle Purchasing, Accounts Payable, and/or Sourcing applications. FIGS. 7 through 13 represent one such implementation. It should be understood that the implementation can be modified and/or revised according to different embodiments of the present invention.

Figure 7:
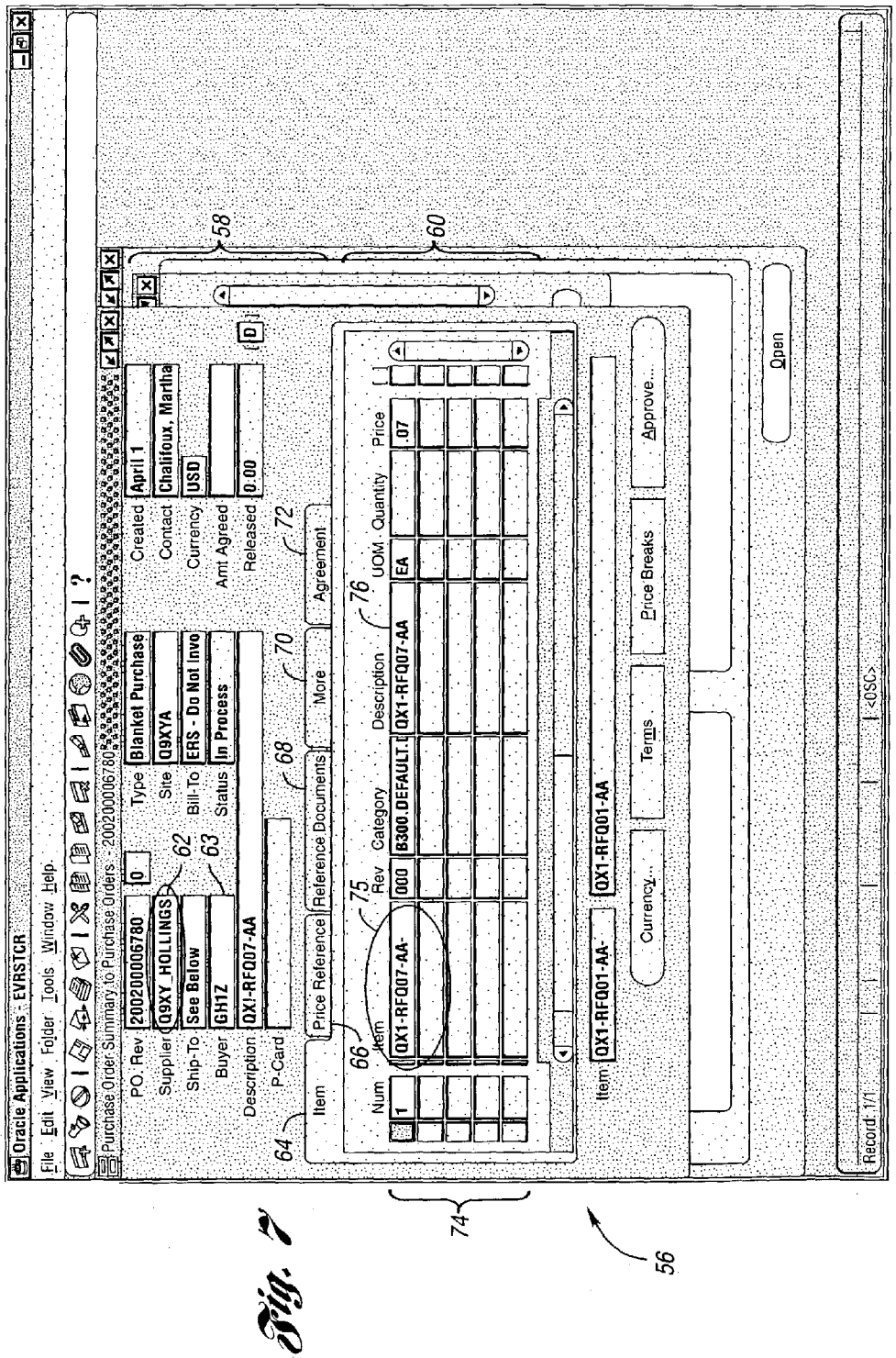
FIG. 7 is an example of a blanket purchase agreement form in accordance with an embodiment of the present invention.

FIG. 7 is an example of a blanket purchase agreement form in accordance with an embodiment of the present invention. Form 56 can include a number of input fields 58 and tabbed sub-forms 60. Notably, input fields 58 can include, but are not limited to, supplier input field 62 and buyer input field 63, and tabbed sub-forms 60 can include, but are not limited to, items sub-form 64, price reference sub-form 66, reference documents sub-form 68, more sub-form 70, and agreement sub-form 72. Items sub-form 64 can include item lines 74 for inputting information relating to items. Notably, item lines 74 can include item input field 75 for inputting an item number and item description input field 76 for inputting an item description. According to FIG. 7, an existing blanket purchase agreement with a supplier, Q9XY Hollingsworth, for item QX1-RFQ07-AA is depicted. Buyer GH1Z created an order associated with the blanket purchase order on April $1^{st}$.

Figure 8:
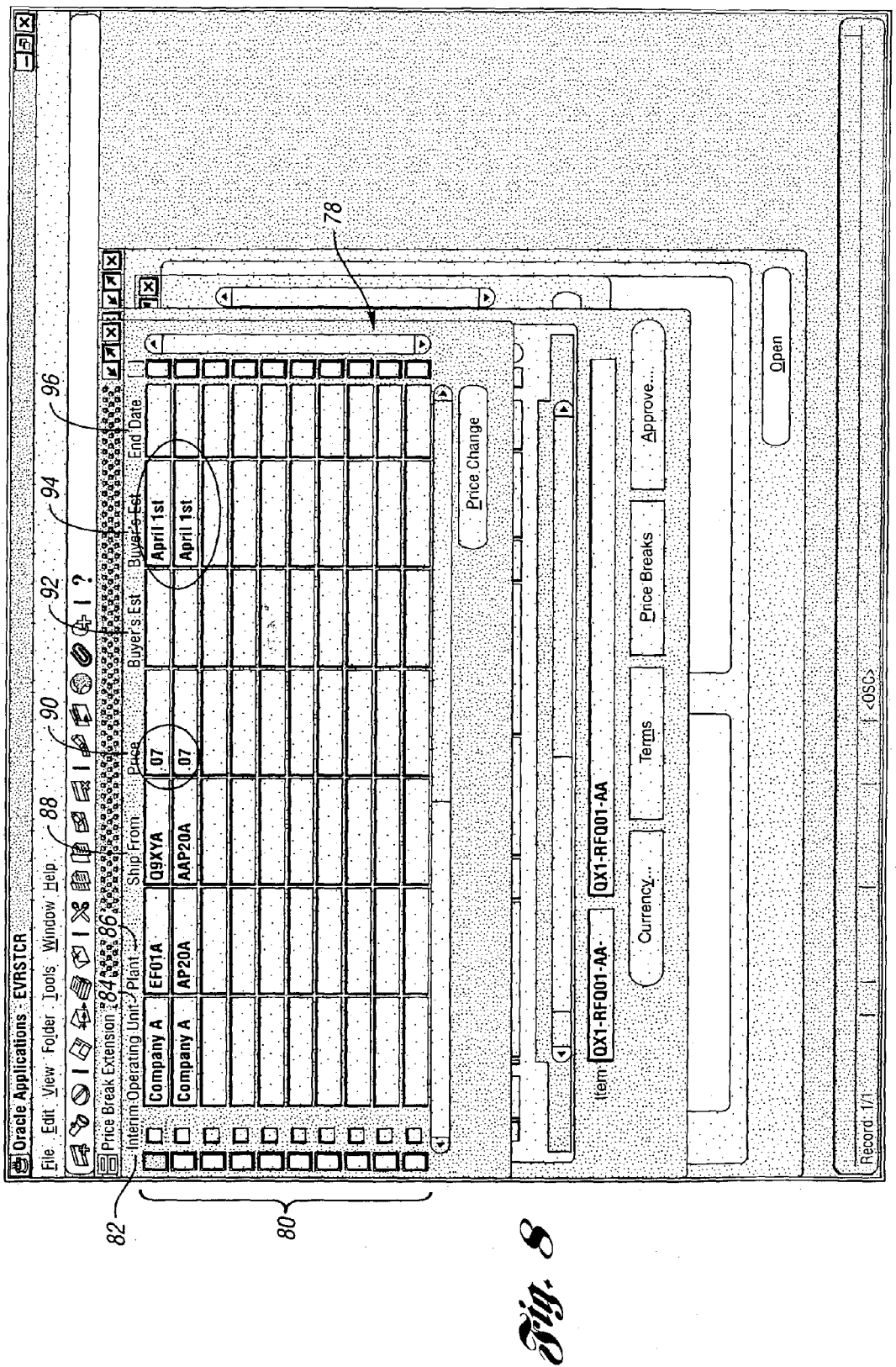
FIG. 8 is an example of an extension form to the blanket purchase agreement form depicted in FIG. 6.

FIG. 8 is an example of an extension form to the blanket purchase agreement form depicted in FIG. 7. Form 78 represents an extension to a blanket purchase agreement for adding a second group of columns to item lines 74. Form 78 can include, but is not limited to, extension item lines 80 for inputting price break extension information, which includes, but is not limited to, interim flag 82, operating unit 84, plant 86, ship from 88, price 90, buyers estimate 92, start date 94, and end date 96. According to FIG. 8, an item is being supplied to two plants, EFO1A and AP20A, at price of $0.07 effective on April $1^{st}$. Since there is no end date displayed, the price is currently effective.

After the blanket purchase agreement depicted in FIG. 7 is established, negotiations between the buyer and supplier can continue to evolve over time. As a non-limiting example, the supplier can agree to a different price, effective on March $1^{st}$. The supplier can then submit the new price in the form of a quote, as depicted, for example, in FIG. 9.

Figure 9:
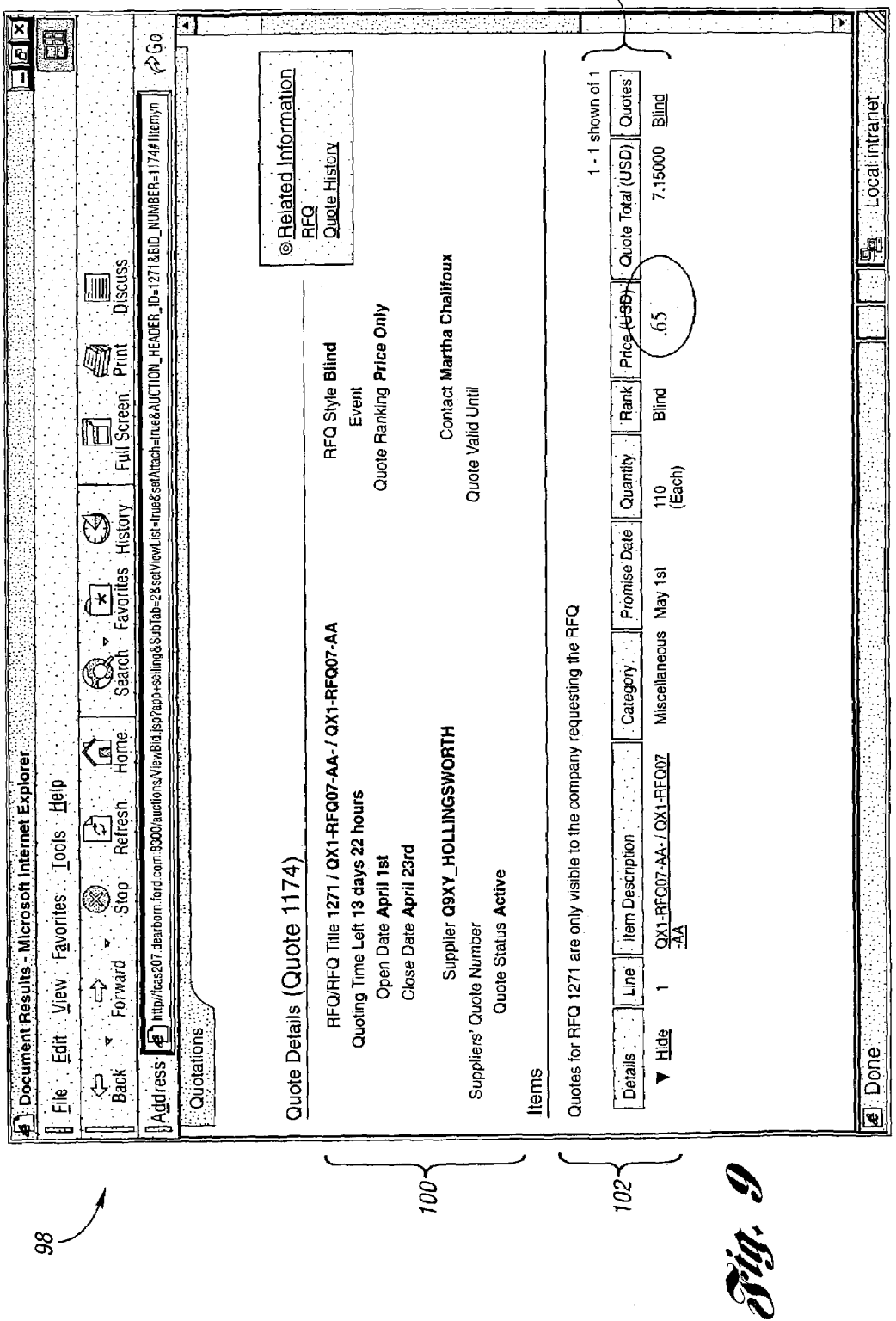
FIG. 9 is an example of a graphical user interface (GUI) for submitting quotes in accordance with an embodiment of the present invention.

FIG. 9 is an example of a graphical user interface (GUI) for submitting quotes in accordance with an embodiment of the present invention. GUI 98 can include, but is not limited to, quote details 100 and item details 102. Quote details 100 can include, but are not limited to, RFQ title, quoting time left, open date, close date, supplier name, suppliers' quote number, quote status, RFQ style, event, quote ranking, contact, and quote valid until. Item details 102 can include, but are not limited to, one or more item lines 104. Each item line 104 can include, but is not limited, details, line number, item description, category, promise date, quantity, rank, price, quote total, and quotes. According to FIG. 9, the supplier Q9XY Hollingsworth submitted a new price of $0.65 on the quote.

The buyer receives the quote depicted in FIG. 9 and can change the effective start date to March $1^{st}$. The change can be made on a recap award sheet GUI, as depicted on FIG. 10.

Figure 11:
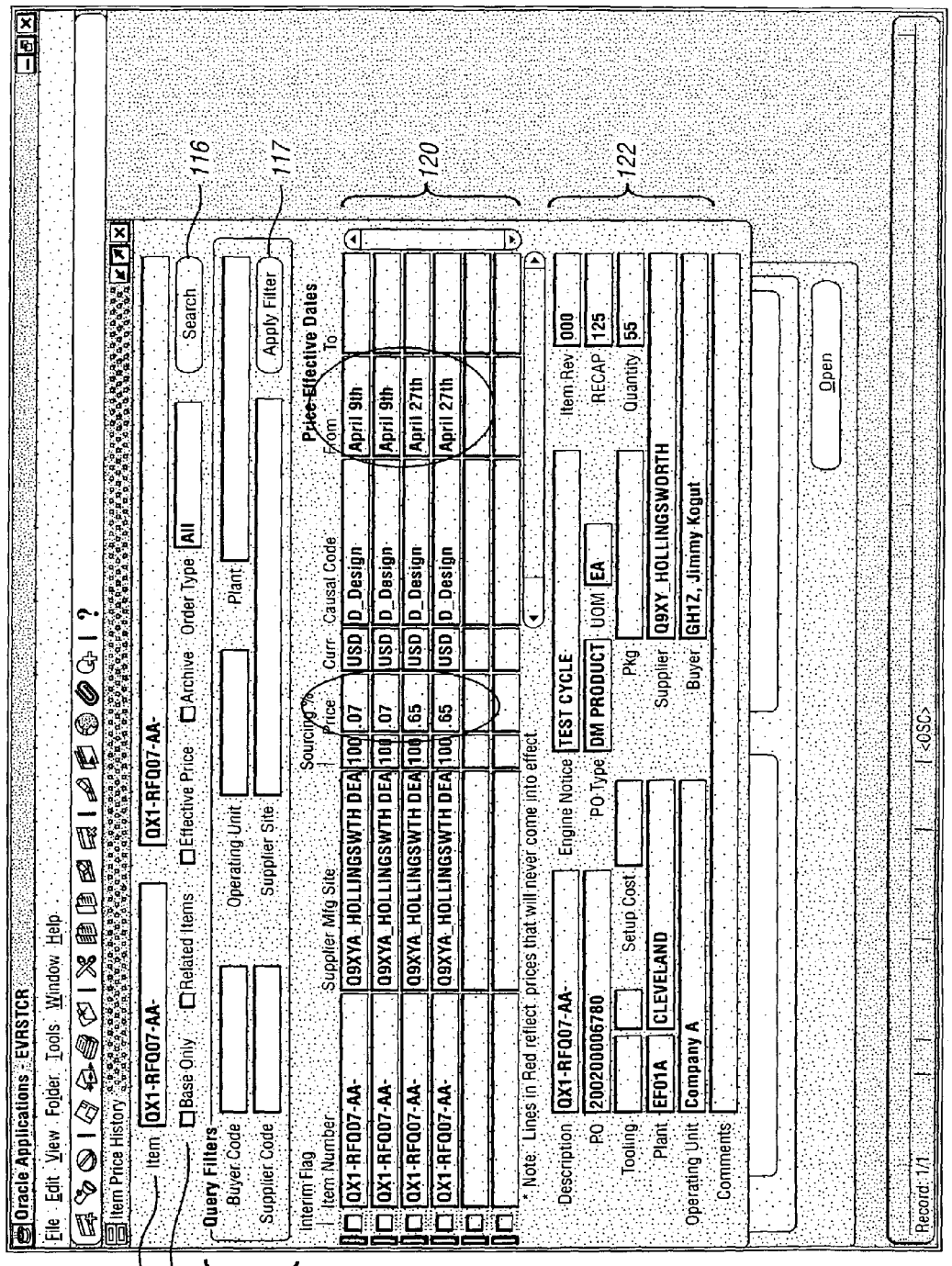
FIG. 11 is an example of an item price history form in accordance with an embodiment of the present invention.

FIG. 11 is an example of a GUI for entering award information in accordance with an embodiment of the present invention. GUI 106 can include, but is not limited to, input fields 108 for entering award information, recap information and RFQ information 110 presented in item line format. Input fields 108 can include, but are not limited to, title, controller office code, reason code, tooling causal code, and effective start date. The recap information can include, but is not limited to, recap number, status, recap date, and auto issue purchase order status. RFQ information 110 can include, but is not limited to, RFQ number, line number, item number and item description.

The computer can track the price change to the new price of $0.65 with the effective date of March $1^{st}$. The tracking can be displayed to the user in an item price history form. FIG. 11 is an example of an item price history form in accordance with an embodiment of the present invention. Item price history form 111 can display information originating from the blanket purchase agreement and any price change information.

The user can query the item price history for an item by entering an item number in item input field 112. The query can be limited based on query limiters 114, which can include, but are not limited to, base only, related items, effective price, archive, and order type, and query filters 116, which can include, but are not limited to, buyer code, operating unit, plant, supplier code, and supplier site. The query can be initiated by the user clicking on search button 116. Query filters 116 can be applied by clicking on apply filter button 112.

When a query is initiated, the computer searches for items which match the query criteria. As depicted by FIG. 11, the computer searched for item name "QX1-RFQ07-AA-" and order type "all." Items matching the query criteria can be displayed to the user on item price history form 111 along with information pertinent to the items. The item information can be displayed in item table 120. Item table 120 can include, but is not limited to, several columns of information, which can include interim flag, item number, supplier manufacturing site, sourcing percentage, price, currency, causal code, "from" effective date, and "to" effective date.

An item line can be displayed for each record in the item price history. In the case of item number QX1-RFQ07-AA-, there are four item lines displayed. The first and second item lines reflect a price of $0.07 for item number QX1-RFQ07-AA- being supplied on the blanket purchase agreement with an effective date of April $1^{st}$. The third and fourth item lines reflect the price change of $0.07 to $0.65 made retroactively from the "from" effective date of March $1^{st}$. The first and second item lines can be colored in red to reflect that the price of $0.07 will not come into effect because of the change in effective date (from April $1^{st}$ to March $1^{st}$) and price (from $0.07 to $0.65).

Item price history form 111 can also include several item description fields 122, which can include, but are not limited to, description, engineering notice, item revision, purchase order number and revision, purchase order type, unit of measure, recap number, tooling number, package, quantity, plant, supplier, operating unit, buyer, and comments.

Figure 12:
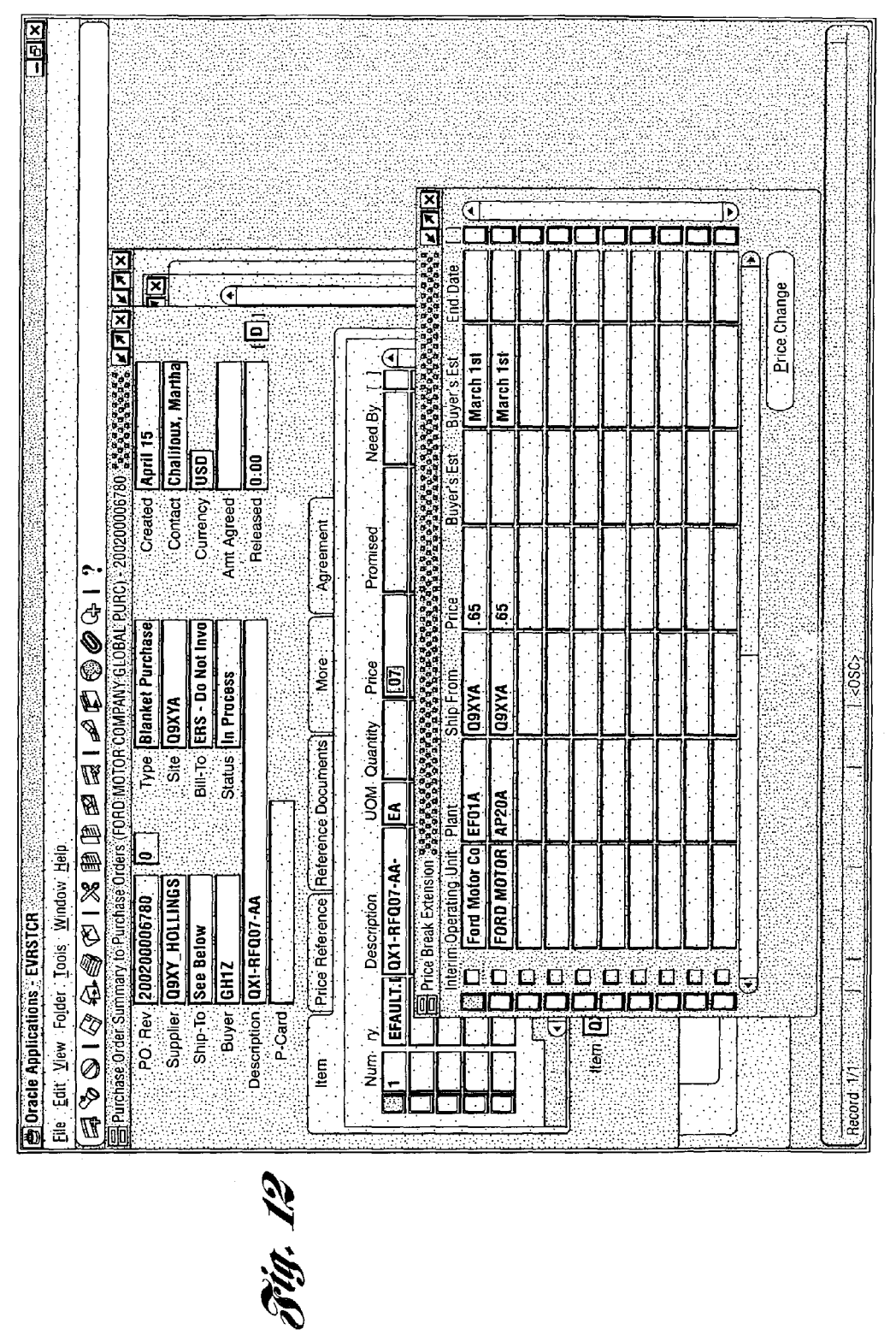

The computer can revise the blanket purchase agreement to reflect a price change and/or effective date. FIG. 12 is an example of a blanket purchase order that has been revised due to a change in price and effective date. In the case of a blanket purchase agreement which is revised to reflect changed with an effective date in the past, the computer can execute a software application for effectuating retroactive price change.

The software application can be used to search for receipts that fall within an effective date range for the particular item, supplier, unit of measure code, and/or plant code. The ship date on the receipt is used to compare with the effective date range that appears on the Blanket Purchase Agreement.

Once the relevant receipts are determined, a variance calculation can be based on the new price and the last price paid. A price variance can be determined from the following calculations: last price paid multiplied by quantity. The price variance value can be stored in a retro pricing database. After each retro price change, the price variance value can be updated to reflect the most recent price change.

An invoice can be created for each receipt that was impacted by the retro price change. This invoice can be for a positive or negative amount, depending on whether the change is in the favor of the buyer or the supplier. The invoice can have a description of "retro pricing invoice".

Figure 13:
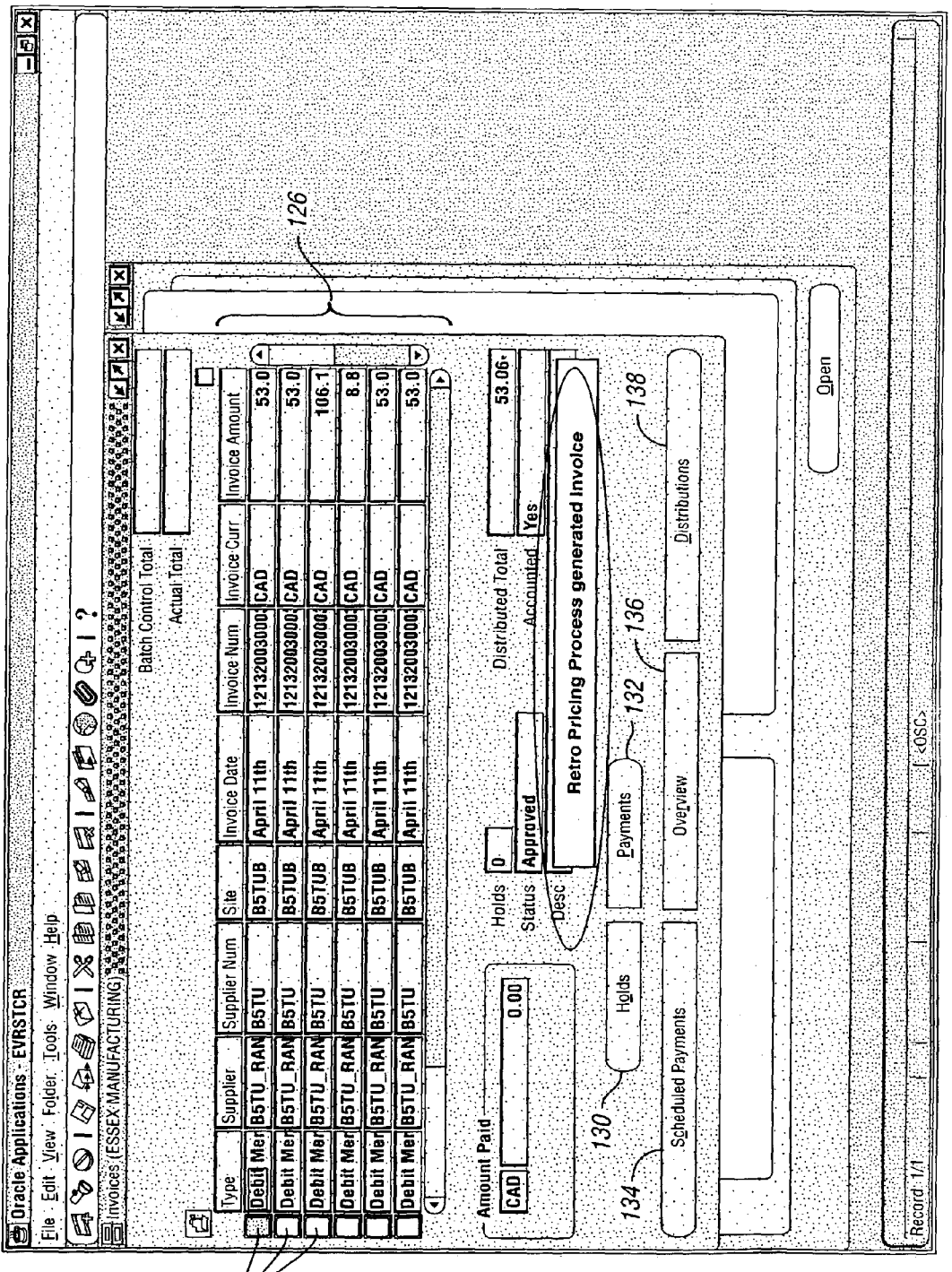
FIG. 13 is an example of a blanket purchase agreement form revised to reflect a price change and/or effective date in accordance with an embodiment of the present invention.

FIG. 13 is an example of a retro pricing invoice form in accordance with an embodiment of the present invention. Retro pricing invoice form 124 can include retro pricing receipt table 126. Table 126 can include receipt lines 128. Each receipt line can include, but is not limited to, the following information receipt type, supplier, supplier number, site, invoice date, invoice number, invoice currency, and invoice amount. Retro pricing invoice form can also include other information, such as batch control total, actual total, amount paid, holds, distribution total, status accounted, and description. Form 124 can also include buttons for accessing other invoice related information, such as holds button 130, payments button 132, scheduled payments 134, overview 136, and distributions 138.

While the best mode for carrying out the invention has been described in detail, those familiar with the art to which their invention relates will recognize various alternative designs and embodiments for practicing the invention as defined by the following claims.

What is claimed:

1. A computer-implemented method for determining retroactive price for a part being supplied by a single supplier entity and supplied to first and second plants of a single buyer entity, the method comprising:
   (a) on a first acquisition date, firstly acquiring a part for use by a first plant from a supplier before establishing a price for acquiring the part;
   (b) after the first acquiring step, receiving a first initiation message including a first effective time period and a first new price for the part and for initiating a first pricing event for the part acquired for use by the first plant from the supplier;
   (c) after the first acquiring step, for the first initiation message, retrieving information pertinent to an at least one receipt received for the part within the first effective time period, the information for each receipt including a receipt date and a receipt quantity;
   for each receipt,
      determining a first price based on the first new price and the receipt quantity; and
      generating an invoice enabling transfer of the first price, the invoice including the first price, wherein the first effective time period starts on the first acquisition date, which is on or before each receipt date;

(d) on a second acquisition date, secondly acquiring the part for use by a second plant from the supplier after establishing the first new price;

(e) after the second acquiring step, receiving a second initiation message including a second effective time period and a second new price for the part and for initiating a second pricing event for the part acquired for use by the second plant from the supplier;

(f) after the second acquiring step, for the second initiation message, retrieving information pertinent to an at least one receipt received for the part within the second effective time period, the information for each receipt including a receipt date, a receipt quantity, and a receipt price, wherein the receipt price is the first new price;

for each receipt,
determining a variance based on the difference between the second new price and the first new price;
determining a second price based on the variance and the receipt quantity; and
generating a retroactive invoice enabling transfer of the second price, the retroactive invoice including the variance and the second price, wherein the second effective time period starts on a second effective date, which is after the second acquisition date,
whereby at least one retroactive invoice is relied upon by the buyer for the first and second plants and the supplier for the first and second plants for receiving price retroactively.

2. The method of claim 1 wherein the second acquiring step is carried out according to a blanket purchase agreement.

3. The method of claim 2 wherein the blanket purchase agreement is created upon receipt of the part by the second plant.

4. The method of claim 1 wherein the first and second effective time periods each end on an end effective date.

5. The method of claim 1 wherein if the variance for at least one receipt is positive, the retroactive invoice for the at least one receipt is comprised of a credit invoice.

6. The method of claim 5 further comprising transferring the price for the at least one receipt to the supplier.

7. The method of claim 1 wherein if the variance for at least one receipt is negative, the retroactive invoice for the at least one receipt is comprised of a debit invoice.

8. The method of claim 7 further comprising transferring the debit invoice for the at least one receipt to the supplier.

9. The method of claim 1 further comprising generating a pricing report for at least one receipt from the information of at least one of the first or second pricing initiation messages, the pricing report including the receipt date, the receipt quantity, and the first price or the second price.

10. The method of claim 9 further comprising transmitting the pricing report to the supplier.

11. The method of claim 10 wherein the transmitting step is comprised of transmitting the pricing report via an electronic data interface.

12. A computer-implemented system for determining retroactive price for a part being supplied by a single supplier entity and supplied to first and second plants of a single buyer entity, the system comprising at least one server computer communicating with at least one client computer, wherein the at least one server computer:

(a) receives a first acquisition message identifying that a part has been acquired on a first acquisition date for use by a first plant from a supplier before establishing a price for acquiring the part;

(b) after the first acquisition date, receives a first initiation message including a first effective time period and a first new price for the part and for initiating a first pricing event for the part acquired for use by the first plant from the supplier;

(c) after the first acquisition date, for the first initiation message, retrieves information pertinent to an at least one receipt received for the part within the first effective time period, the information for each receipt including a receipt date and a receipt quantity;

for each receipt,
determines a first price based on the first new price and the receipt quantity; and
generates an invoice enabling transfer of the first price, the invoice including the first price, wherein the first effective time period starts on the first acquisition date, which is on or before each receipt date;

(d) receives a second acquisition message identifying that a part has been acquired on a second acquisition date for use by a second plant from the supplier after establishing the first new price;

(e) after the second acquiring step, receives a second initiation message including a second effective time period and a second new price for the part and for initiating a second pricing event for the part acquired for use by the second plant from the supplier;

(f) after the second acquiring step, for the second initiation message, retrieves information pertinent to an at least one receipt received for the part within the second effective time period, the information for each receipt including a receipt date, a receipt quantity, and a receipt price, wherein the receipt price is the first new price;

for each receipt,
determines a variance based on the difference between the second new price and the first new price;
determines a second price based on the variance and the receipt quantity; and
generates a retroactive invoice enabling transfer of the second price, the retroactive invoice including the variance and the second price,
wherein the second effective time period starts on a second effective date, which is after the second acquisition date,
whereby at least one retroactive invoice is relied upon by the buyer for the first and second plants and the supplier for the first and second plants for receiving retroactive price.

13. The system of claim 12 wherein the first effective time period ends on an end effective date.

14. The system of claim 13 wherein the first new price is effective for the first effective time period.

15. The system of claim 12 wherein if the variance for at least one receipt is negative, the retroactive invoice for the at least one receipt is comprised of a debit invoice.

16. The system of claim 15 wherein the at least one server computer transfers the debit invoice for the at least one receipt to the supplier.

17. The system of claim 12 wherein the at least one server computer generates a pricing report for at least one receipt from the information of at least one of the first or second initiation messages the pricing report including the receipt date, the receipt quantity, and the first price or the second price.

18. The system of claim 17 wherein the at least one server transmits the pricing report to the supplier.

19. The system of claim 18 wherein the at least one server computer transmits the pricing report via an electronic data interface.

20. A computer-implement process determining retroactive price for a part being supplied by a single supplier entity and supplied to first and second plants of a single buyer entity, the process comprising:
   (a) receiving a first acquisition message identifying that a part has been acquired on a first acquisition date for use by a first plant from a supplier before establishing a price for acquiring the part;
   (b) after the first acquisition date, receiving a first initiation message including a first effective time period and a first new price for the party and for initiating a first pricing event for the part acquired for use by the first plant from the supplier;
   (c) after the first acquisition date, for the first initiation message, retrieving information pertinent to an at least one receipt received for the part within the first effective time period, the information for each receipt including a receipt date and a receipt quantity;
   for each receipt,
      determining a first price based on the receipt quantity; and
      generating an invoice enabling transfer of the first price, the invoice including the first price, wherein the first effective time period starts on the first acquisition date, which is on or before each receipt date;
   (d) receiving a second acquisition message identifying that a part has been acquired on a second acquisition date for use by a second plant from the supplier after establishing the first new price;
   (e) after the second acquiring step, receiving a second initiation message including a second effective time period and a second new price for the part and for initiating a second pricing event for the part acquired for use by the second plant from the supplier;
   (f) after the second acquiring step, for the second initiation message, retrieving information pertinent to an at least one receipt received for the part within the second effective time period, the information for each receipt including a receipt date, a receipt quantity, and a receipt price, wherein the receipt price is the first new price;
   for each receipt,
      determining a variance based on the difference between the second new price and the first new price;
      determining a second price based on the variance and the receipt quantity; and
      generating a retroactive invoice enabling transfer of the second price, the retroactive invoice including the variance and the second price, wherein the second effective time period starts on a second effective date, which is after the second acquisition date; and
   (g) storing one or more of the retroactive invoices in a computer-readable medium for use in pricing parts for one or more plants, whereby at least one retroactive invoice is relied upon by the buyer for the first and second plants and the supplier for the first and second plants for receiving retroactive price.

21. A program including instructions for controlling a computer of a server for determining retroactive price for a part being supplied by a single supplier entity and supplied to first and second plants of a single buyer entity, the instructions stored in the computer on computer-readable medium, the program comprising:
   (a) instructions receiving a first acquisition message identifying that a part has been acquired on a first acquisition date for use by a first plant from a supplier before establishing a price for acquiring the part;
   (b) instructions receiving a first initiation message, after the first acquisition date, the first initiation message including a first effective time period and a first new price for the part and for initiating a first pricing event for the part acquired for use by the first plant from the supplier;
   (c) for the first initiation message, instructions retrieving information, after the first acquisition date, pertinent to an at least one receipt received for the part within the first effective time period, the information for each receipt including a receipt date and a receipt quantity;
   for each receipt,
      instructions determining a first price based on the first new price and the receipt quantity after the first acquisition date; and
      instructions generating an invoice enabling transfer of the first price after the first acquisition date, the invoice including the first price,
      wherein the first effective time period starts on the first acquisition date, which is on or before each receipt date;
   (d) instructions receiving a second acquisition message identifying that a part has been acquired on a second acquisition date for use by a second plant from the supplier after establishing the first new price;
   (e) after the second acquiring step, instructions receiving a second initiation message, after the second acquisition date, the second initiation message including a second effective time period and a second new price for the part and for initiating a second pricing event for the part acquired for use by the second plant from the supplier; and
   (f) for the second initiation message, instructions retrieving information, after the second acquiring step, pertinent to an at least one receipt received for the part within the second effective time period, the information for each receipt including a receipt date, a receipt quantity, and a receipt price, wherein the receipt price is the first new price;
   for each receipt,
      instructions determining a variance based on the difference between the second new price and the first new price after the second acquiring step,
      instructions determining a second price based on the variance and the receipt quantity after the second acquiring step; and
      instructions generating a retroactive invoice enabling transfer of the second price after the second acquisition date, the retroactive invoice including the variance and the second price, wherein the second effective time period starts on a second effective date, which is after the second acquisition date,
      whereby at least one retroactive invoice is relied upon by the buyer for the first and second plants and the supplier for the first and second plants for receiving retroactive price.

* * * * *